3,044,179
CARBON RECOVERY
Ronald W. Chapman, Whittier, John C. Ahlborn, Monterey Park, and Roger M. Dille, Whittier, Calif., assignors to Texaco Inc., a corporation of Delaware
Filed May 29, 1958, Ser. No. 738,816
2 Claims. (Cl. 34—9)

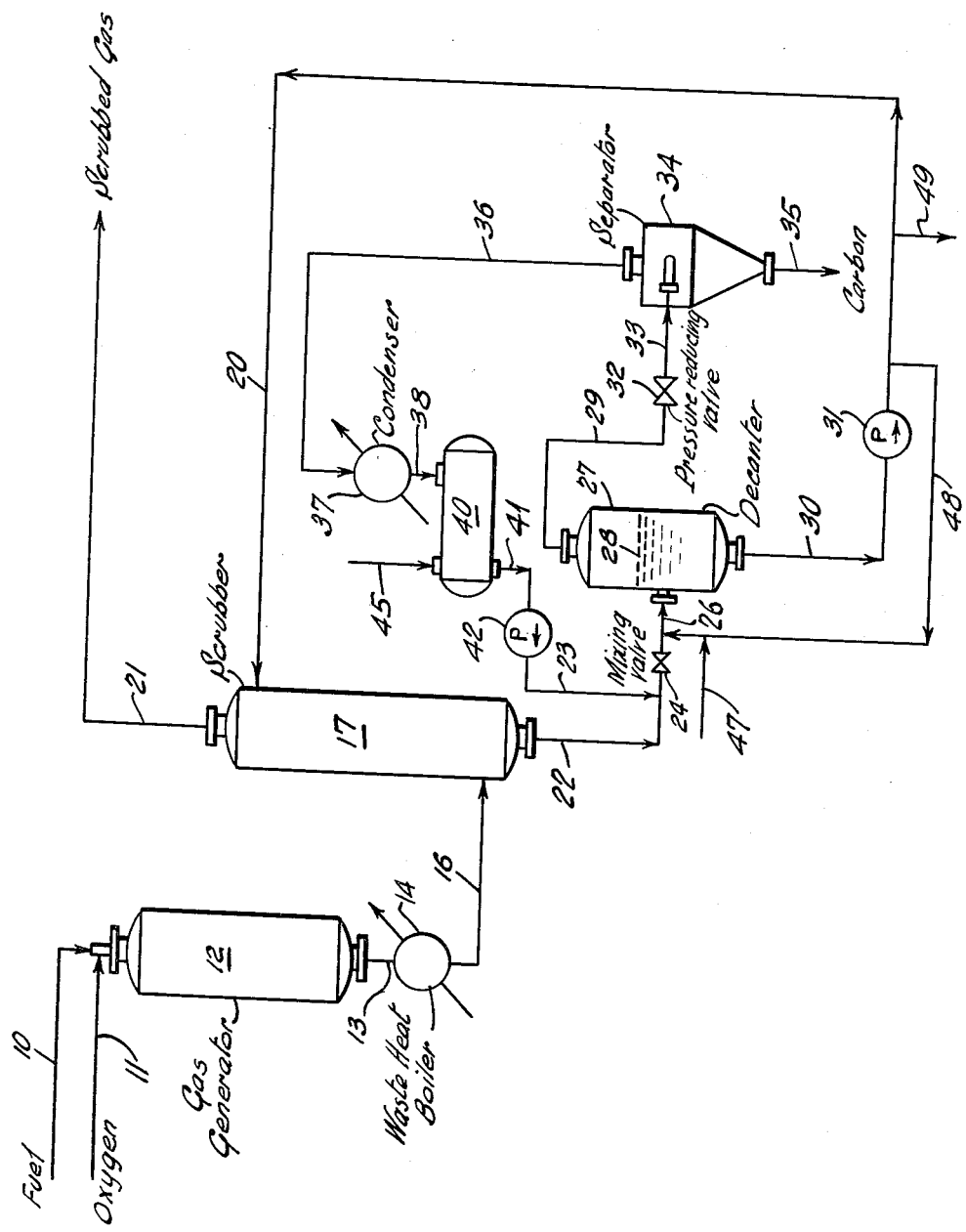

This invention relates to a process for the production of carbon monoxide and hydrogen from fossil fuels by reaction with oxygen. In one of its more specific aspects it is directed to a method of separating carbonaceous solid entrained in the gaseous products of reaction of fossil fuels and oxygen wherein said products are scrubbed with water, carbonaceous solid is separated from the scrubbing water by contacting with a liquid hydrocarbon, clarified water and a slurry of carbon in hydrocarbon are separated and the hydrocarbon is recovered for reuse by vaporization.

The generation of carbon monoxide and hydrogen by the partial oxidation of fossil fuels is a highly economic method of producing these gases. In the partial oxidation process, a fossil fuel, for example, coal, petroleum oil, or natural gas, is reacted with an oxygen-containing gas in a closed, compact reaction zone at an autogenous temperature within the range of about 1800 to 3500° F. preferably about 2200 to 2800° F. Preheating the reactants is generally desirable. The reaction zone is free from packing and catalyst and has nearly minimum internal surface. The reaction zone is maintained at a pressure above about 100 pounds per square inch gauge and may be as high as about 600 pounds per square inch gauge. Steam may be introduced into the reaction zone to assist in the dispersion of the fuel into the reactor, to assist in control of the reaction temperature, and as a reactant to increase the relative amount of hydrogen produced. The product consists essentially of carbon monoxide and hydrogen and relatively small amounts of water vapor, carbon dioxide, nitrogen, methane, and entrained carbonaceous solid. The carbonaceous solid is in the form of very fine carbon particles, and upon separation is useful as carbon black.

The amount of uncombined oxygen supplied to the reaction zone is limited so that near maximum yields of carbon monoxide and hydrogen are obtained. Air, oxygen-enriched air or substantially pure oxygen may be employed in the process. Oxygen of high purity may be readily obtained by the rectification of air. Commercial oxygen plants capable of delivering large amounts of high purity oxygen typically produce oxygen streams containing in excess of 95 mol percent oxygen, and oxygen of this purity is generally preferred.

Product gases issuing from the gas generation step contain a large amount of sensible heat. This heat may be employed to convert water to steam. For example, if the synthesis gas is to be passed to a process requiring additional steam, for example, a water gas shift process, steam may be generated by introducing water directly into the effluent gases from the gas generator. Where steam admixed with the synthesis gas stream is not desired, heat may be recovered from the gas generator effluent by passing the gases through heat exchangers or waste heat boilers. Steam for process or power use is advantageously produced in such waste heat boilers. Preheating of process streams, for example, fuel to the gas generation step, may be effected in heat exchangers. When the product gases are cooled by indirect heat exchange, it is preferred to cool the gases only to a temperature above the dew point at the prevailing pressure to avoid fouling of heat transfer surfaces occasioned by condensation of water and adhesion of entrained carbon.

The entrained carbon is effectively removed from the product gases by contacting the cooled synthesis gas with water in gas-liquid contact apparatus, for example, spray towers, bubble towers, baffle towers or packed towers. Cooling of the synthesis gas may also be effected in the scrubbing zone by vaporizing a part of the scrubbing water, by cooling the scrubbing water, or both. It is desirable to maintain the solids content of the water in the scrubbing zone less than about 2 percent solids and preferably about 1 percent solids for satisfactory pumpability. The solids content is controlled by withdrawing a portion of solids dispersion from the bottom of the scrubbing zone, removing the solids therefrom and returning clarified water to the top of the scrubbing zone. Since the amount of dispersion which must be processed for solids removal at a given carbon production rate varies inversely with the solids content of the dispersion, it is preferred to maintain the solids content of the dispersion withdrawn from the bottom of the scrubber at about 1 percent. However, efficient washing may require higher liquid rates than the amount of liquid required to suspend the separated carbon, and so a portion of the solids dispersion may be recycled to provide sufficient scrubbing liquid. The temperature of the dispersion withdrawn from the scrubbing zone is advantageously maintained at a high temperature to facilitate succeeding process steps. The scrubbing temperature can, of course, be no higher than the boiling point of water at the prevailing pressure. A substantial temperature differential may be maintained in the scrubbing zone by introducing cooled scrubbing water at the top of the scrubbing zone so that the clean scrubbed gas is discharged at a relatively low temperature and corresponding low water vapor content. It is desirable to operate the scrubber at high pressure, that is, substantially the pressure of the gas generator with allowance for pressure drop through lines and heat transfer equipment. The use of high pressures makes possible the use of relatively high temperatures in the scrubbing zone, effects advantages in succeeding carbon separating steps, delivers the product gas for use with a minimum of compression.

The dispersion of solid carbon in water withdrawn from the scrubbing zone is contacted with oil to effect transfer of the solid carbon from the water dispersion to the oil forming a slurry of carbon in a liquid hydrocarbon. Hydrocarbons suitable in the process of this invention include those which are liquid at the pressure and temperature of the contacting zone and which may be flash vaporized by the release of pressure. For the purpose of describing this invention, flash vaporization is defined as the vaporization of a liquid at an initial temperature and pressure which occurs upon adiabatic pressure reduction from said initial pressure to a final pressure less than the vapor pressure of the aforesaid liquid at its initial temperature. Suitable hydrocarbons, for example, include butanes, pentanes, hexanes, benzol, toluol, natural gasoline, gasoline, naphtha, their mixtures and the like. Hydrocarbons have a relatively high carrying capacity for carbonaceous solid as compared with water. Pumpable slurries of carbon in liquid hydrocarbon may be produced by contacting the water dispersion with an amount of oil at least five times the weight of dispersed carbon. It is preferred to contact the water dispersion with an amount of hydrocarbon within the range of about ten to thirty times the weight of the carbon contained in the dispersion. Contacting of the liquid hydrocarbon and water dispersion may be effected with a mixing valve, pump, orifice, nozzle, propeller mixer, or turbine mixer. It is preferred to contact the oil and water dispersion at about the temperature and pressure of the scrubbing zone. Higher pressure makes possible the use of lower boiling hydrocarbon oils. High temperature facilities phase separation by reducing oil viscosity.

Clarified water and slurry of carbon in oil is separated by passing the mixed stream to a phase separating zone, for example, a tank providing a relatively quiescent settling zone or a centrifugal separator. If a settling tank is employed, sufficient volume is provided to afford a residence time preferably of at least two minutes. Separation of the oil-carbon slurry from the clarified water may be accelerated by the addition of an emulsion breaker. Clarified water from the phase separator is returned to the scrubbing zone. Advantageously, the oil slurry is passed to a flash vaporization zone through a pressure reducing means, for example, a valve or orifice. Upon reduction of pressure, the hydrocarbon is vaporized by its sensible heat to form a suspension of carbonaceous solid in hydrocarbon vapor. The suspension is passed to a vapor-solid separator wherein the hydrocarbon vapor is separated from the solid particles, for example, a cyclone separator, quiescent settler, Cottrell precipitator or a filter. Solid carbon is withdrawn by conventional solids handling equipment, for example, conveyors, solids pumps, or the like. Hydrocarbon vapor is passed through heat exchangers or condensers to liquefy the hydrocarbon. The hydrocarbon may be compressed if necessary so that condensation may be effected at usual cooling water temperatures. The liquid hydrocarbon is then returned to the contacting zone for re-use. Alternatively, vaporization may be effected by reducing the partial pressure of the hydrocarbon component of the oil-carbon slurry by employing a stripping gas, for example, steam or a hydrocarbon gas.

When ash-containing fossil fuels, for example, coal, are used for the production of carbon monoxide and hydrogen, it is generally desirable to separate at least a part of the ash from the reaction products. Removal of the ash increases the utility and value of the carbon which is separately recovered and facilitates the clarification of the carbon-containing scrubbing water. A large part of the ash is easily removed in a quench zone wherein the products are cooled by direct contact with water and the molten ash converted to a sand-like solid slag which settles to the bottom of the quench zone and may be withdrawn through lock hoppers. The quenched gas containing entrained carbon and fine slag is then contacted with water in a scrubbing zone to effect removal of substantially all of the solids from the gas forming a dispersion of solid in the scrubbing water. The scrubbing water dispersion is then passed to one or more settlers where the relatively coarse and dense slag particles are settled and the water containing dispersed carbon particles is withdrawn. The carbon-water dispersion is then contacted with oil as described above to effect clarification of the water and formation of an oil-carbon slurry.

An advantage of the process of this invention is that carbon is effectively and efficiently removed from synthesis gas.

Another advantage of the process of this invention is that the carbon formed in the manufacture of synthesis gas is separated as a dry solid suitable for use as carbon black.

Another advantage of this process is that heat contained in gas generation products is efficiently utilized.

Having set forth its general nature the invention will be best understood from the more detailed description hereinafter which refers to the accompanying drawing. Although the drawing illustrates one arrangement of apparatus in which the process of this invention may be practiced it is not intended to limit the invention to the particular apparatus or material described. A fuel, for example, bunker fuel oil dispersed in steam, in line 10 and oxygen in line 11 are passed to gas generator 12. The fuel, oxygen and steam react in generator 12 at an autogenous temperature of about 2600° F. to produce carbon monoxide, hydrogen, and entrained carbon. Hot products issuing from gas generator 12 in line 13 are passed to waste heat boiler 14 where high pressure steam is generated. Cooled products at a temperature about 450° F. are passed through line 16 to scrubber 17. In scrubber 17 the gaseous products are contacted countercurrently with water introduced through line 20. Scrubbed gas from which carbon has been separated is withdrawn from the top of scrubber 17 through line 21 and discharged to utilization not shown. A dispersion of carbon particles in water is withdrawn through line 22 and is passed with liquid hydrocarbon in line 23 through mixing valve 24. The water dispersion and liquid hydrocarbon are intimately contacted in mixing valve 24 effecting transfer of the carbon from the water dispersion to the hydrocarbon phase forming an oil-carbon slurry. The oil-carbon and water pass through line 26 to decanter 27. Two phases form in decanter 27, an oil slurry phase which floats on top of a water phase with interface 28. The oil slurry phase is withdrawn through line 29.

Clarified water is withdrawn through line 30 and is recycled by pump 31 and line 20 to the scrubber. The oil slurry is passed through pressure reducing valve 32 where the pressure is reduced to a pressure substantially below the vapor pressure of the hydrocarbon at the prevailing temperature. As the oil slurry passes through reducing valve 32 it is flashed to a suspension of carbon in hydrocarbon vapor. The suspension of solids in vapor is passed through line 33 to cyclone separator 34 where the solid liquid carbon is separated and withdrawn through line 35. Hydrocarbon vapor is withdrawn through line 36 and passed to condenser 37 where it is contacted in indirect heat exchange with cooling water to condense liquid hydrocarbon which passes through line 38 into accumulator drum 40. Hydrocarbon liquid in drum 40 is withdrawn through line 41 and passed by pump 42 through line 23 in contact with additional water-carbon dispersion. Hydrocarbon make-up is added through line 45 as needed to replace hydrocarbon lost from the system. It has been observed that the separation of the oil-carbon slurry from the water in the decanter may be improved by adding dilution water through line 48 to the oil-carbon water mixture flowing in line 26 as indicated. It may be desirable to withdraw a portion of the circulating water stream as blow-down through line 49 to prevent the accumulation of water soluble impurities particularly if the dew point of the raw synthesis gas is less than the temperature of the scrubber outlet. Make-up water to compensate for losses and blow-down is added as necessary through line 47.

*Example I*

In an example of the process of this invention a synthesis gas is produced from a bunker fuel oil. Bunker fuel oil at a rate of about 7,357 pounds per hours is reacted with oxygen and steam to produce a synthesis gas at the rate of 382,530 standard cubic feet per hour containing 13.6 percent water vapor and having the following composition (mol percent, dry, sulfur-free basis):

| | |
|---|---|
| Carbon monoxide | 41.9 |
| Hydrogen | 53.2 |
| Carbon dioxide | 3.4 |
| Methane | 0.2 |
| Nitrogen | 1.3 |

The gas generator is operated at a pressure of 425 pounds per square inch gauge and at an autogenous temperature of 2400° F. The hot gases from the generator are passed through a waste heat boiler where heat at a rate of 9.0 million B.t.u. per hour is absorbed in the generation of steam. The cooled gas is passed to a water scrubber. Cold water is added at the top of the scrubber at a temperature of 100° F. and at a rate of 24,840 pounds per hour. In addition, hot carbon-water dispersion at a temperature of 425° F. and at a rate of about 100,000 pounds per hour is recycled to an intermediate point in the scrubber. The entrained carbon is effectively removed as the gas passes through the scrubber. The water temperature rises from 100° at the top of the scrubber to 425° at the bottom. Clean gas is withdrawn from the top of the scrubber at a pressure of about 400 pounds per square inch gauge and at a temperature of 212° F. A portion of the water dispersion of carbon is withdrawn from the bottom of the tower at a rate of 24,964 pounds per hour containing 0.5 weight percent carbon. The water dispersion is contacted with 1240 pounds per hour of normal hexane at 418° F. in a mixing valve. A pressure drop of 35 p.s.i. is employed in the mixing valve to effect intimate mixing of the flowing stream. The hexane-carbon-water mixture is discharged into a settling drum providing a settling time of 3.8 minutes. A slurry of carbon in hexane floats to the top of the water. Clarified water at a rate of 24,840 pounds per hour is withdrawn from the settling drum, passed through a heat exchanger and a cooler to reduce the water temperature to 100° F. The water is then recirculated to the scrubber.

The hexane-carbon slurry is decanted from the top of the separator and passed through a pressure reducing valve where the pressure is reduced to 45 pounds per square inch absolute. Upon expansion, the temperature of the dispersion drops to 225° F. and all of the hexane is vaporized leaving a suspension of solid carbon particles in hexane vapor. The suspension of carbon particles in vapor is passed through a cyclone separator and filter for separation of the carbon. Carbon black at a rate of 124 pounds per hour is separated. Hexane vapor is passed through a condenser and cooled to 200° F. to form liquid hexane. The liquid hexane is then contacted with additional carbon-water dispersion for the continued separation of carbon.

*Example II*

Synthesis gas is scrubbed to separate carbon forming a carbon-water dispersion containing 0.41 weight percent carbon. The carbon-water dispersion is contacted with an 80.6° API light straight run gasoline having a 19.2 Reid vapor pressure and a 312° F. ASTM distillation end point at a rate of 0.10 gallon per gallon of carbon-water dispersion at a combined stream temperature of 350° F. and at a pressure of 250 pounds per square inch gauge. Clarified water and carbon-gasoline slurry are separated. The carbon-gasoline slurry at 350° F. and 250 pounds per square inch gauge is flashed by passing through a control valve into a tank maintained at 2 pounds per square inch gauge. The flashed gasoline vapor is withdrawn from the tank, filtered to remove entrained carbon, and condensed by cooling in an indirect heat exchanger. The condensate is clean, and suitable for reuse in the removal of carbon from additional carbon-water dispersion.

Obviously many modifications and variations of the invention, as hereinbefore set forth, may be made without departing from the spirit and scope thereof, and only such limitations should be imposed as are indicated in the appended claims.

We claim:

1. In a method of recovering carbonaceous solid from a dispersion of carbonaceous solid in water wherein said dispersion is contacted with a volatile liquid hydrocarbon effecting transfer of said carbonaceous solid from water to said hydrocarbon liquid, the improvement which comprises contacting said dispersion with volatile liquid hydrocarbon in liquid phase in an amount within the range of 5 to 30 parts by weight per part carbonaceous solid in a mixing zone at an elevated pressure above about 100 p.s.i.g. and at a temperature above the temperature required for substantially complete vaporization of said volatile hydrocarbon at a subsequently reduced pressure, separating aqueous and oil phases comprising water and a slurry of solid particles in volatile hydrocarbon liquid respectively at said elevated pressure, passing said slurry to a vaporization zone maintained at a pressure lower than the pressure of said mixing and separating steps, effecting substantially complete vaporization of volatile liquid hydrocarbon from said slurry by flash vaporization at said reduced pressure forming a dispersion of carbon in hydrocarbon vapors, and separating carbonaceous solid substantially free from water and liquid hydrocarbon from said hydrocarbon vapors.

2. A process as defined in claim 1 wherein said separated hydrocarbon vapors are condensed, and condensed liquid hydrocarbon is passed to said mixing zone as at least a portion of said hydrocarbon liquid contacted therein.

References Cited in the file of this patent

UNITED STATES PATENTS

| | | |
|---|---|---|
| Re. 22,454 | Weigand | Mar. 7, 1944 |
| 736,381 | Gloyner | Aug. 18, 1903 |
| 1,955,065 | Hawley | Apr. 17, 1934 |
| 2,226,532 | Hawley | Dec. 31, 1940 |
| 2,587,107 | Cade | Feb. 26, 1952 |
| 2,665,980 | Carkeek | Jan. 12, 1954 |
| 2,677,439 | Hedberg | May 4, 1954 |
| 2,746,564 | Williams | May 22, 1956 |
| 2,781,246 | Goldtrap | Feb. 12, 1957 |
| 2,793,938 | Frank | May 28, 1957 |
| 2,903,423 | Mondria et al. | Sept. 8, 1959 |

OTHER REFERENCES

Convertal Process of Coal Slurry Treatment, Bureau of Mines Information Circular 7660.